United States Patent
Welch

(10) Patent No.: US 8,876,603 B1
(45) Date of Patent: Nov. 4, 2014

(54) VIDEO GAME CONTROLLER DEVICE INCLUDING FIREARM CONTOUR WITH MOUNTS TO CONNECT CONTROLLER TO TRIGGER

(71) Applicant: Ryan Welch, Dyersburg, TN (US)

(72) Inventor: Ryan Welch, Dyersburg, TN (US)

( * ) Notice: Subject to any disclaimer, the term of this patent is extended or adjusted under 35 U.S.C. 154(b) by 11 days.

(21) Appl. No.: 13/625,389

(22) Filed: Sep. 24, 2012

(51) Int. Cl.
  *A63F 9/24* (2006.01)
  *A63F 13/00* (2014.01)
  *G06F 17/00* (2006.01)
  *G06F 19/00* (2011.01)

(52) U.S. Cl.
  USPC .................................. 463/36; 463/37; 463/38

(58) Field of Classification Search
  USPC ................................. 463/36, 37, 38
  See application file for complete search history.

(56) References Cited

U.S. PATENT DOCUMENTS

| 7,510,477 B2 | 3/2009 | Argentar |
| 7,736,230 B2 | 6/2010 | Argentar |
| 2005/0197178 A1 | 9/2005 | Villegas |
| 2008/0015017 A1* | 1/2008 | Ashida et al. ................... 463/37 |
| 2009/0197679 A1* | 8/2009 | Argentar ......................... 463/36 |
| 2011/0092290 A1 | 4/2011 | Huebner |
| 2011/0111374 A1 | 5/2011 | Charles |

FOREIGN PATENT DOCUMENTS

WO  2010012211 A1  2/2010

* cited by examiner

*Primary Examiner* — William M. Brewster
(74) *Attorney, Agent, or Firm* — Waddey & Patterson, P.C.; Ryan D. Levy

(57) ABSTRACT

A videogame controller device with a videogame controller housing, the housing having a firearm accessory exterior contour one or more firearm mounts on the videogame controller housing, the one or more mounts for connecting the videogame controller housing to a firearm; and a trigger switch jack for operating a button to simulate firing in a videogame.

20 Claims, 8 Drawing Sheets

FIG. 1B  FIG. 2B

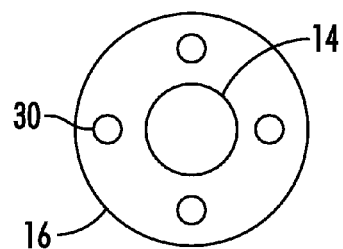
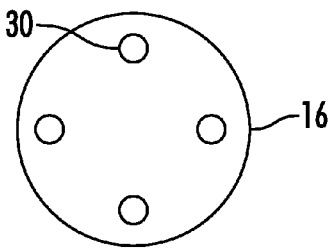
FIG. 6A  FIG. 6B
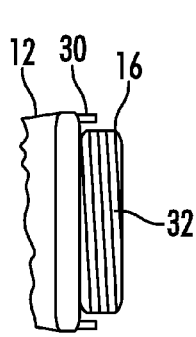
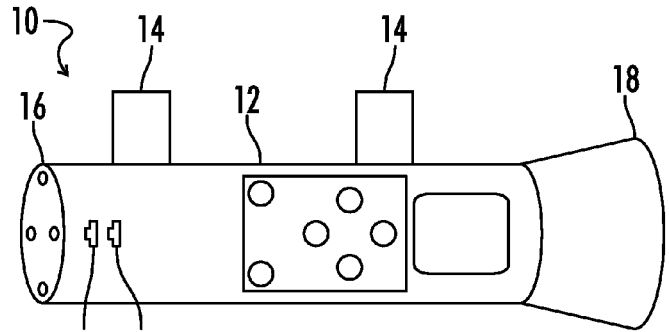
FIG. 6C  FIG. 7
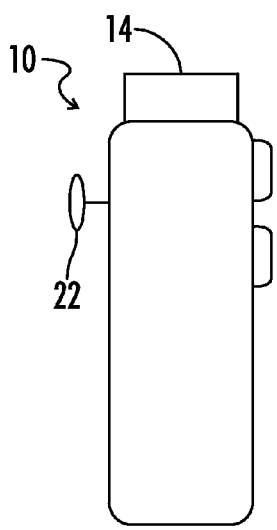
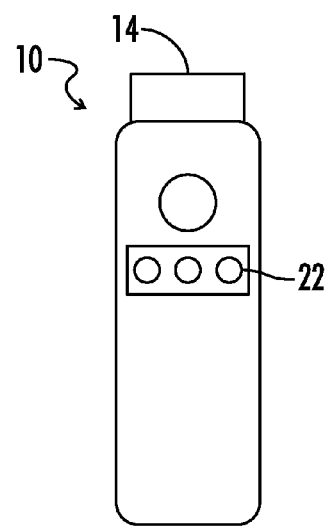
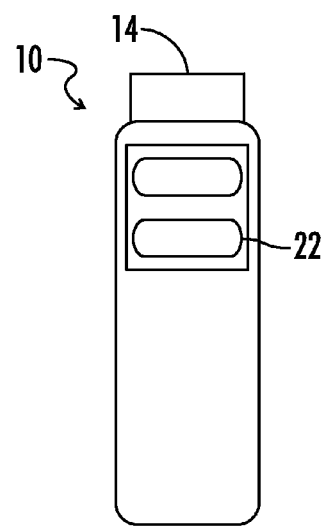
FIG. 8A  FIG. 8B  FIG. 8C

VIDEO GAME CONTROLLER DEVICE INCLUDING FIREARM CONTOUR WITH MOUNTS TO CONNECT CONTROLLER TO TRIGGER

BACKGROUND OF THE INVENTION

The present invention relates to a video game controller device, the video game controller device having a unique capability to provide a user with an improved method of playing video games. In optional embodiments, the video game controller device may be adaptable to a variety of different firearm type devices to allow a user to play a video game that incorporates the usage of a firearm type device. Further optional embodiments of the invention include the method of playing a video game with the video game controller that is mountable to a firearm.

Video games nowadays incorporate a variety of different styles of play from action type video games to puzzle type video games. One type of video game that is common among various video games platforms is the first person shooter type of video game. In such style of video game the user sees from a first person perspective in playing the video game and thus can often control the specific point of aim of a firearm used within the video game. There are countless examples of first person shooter video games on the market today with virtually all of them allowing for a person to control where his or her character is aiming so that the specific target within the video game may be hit.

With the advances of the technology within current video game systems, some video game systems utilize a controller which through movement and orientation of the controller may aim at a specific point in a video game for the user. Thus otherwise stated, through moving the game controller the character within the video game can aim differently and thus score more points or better complete an objective.

In enhancing game play and especially for first person shooter style video games, video game controllers may include motion sensors so that the motion of the controller can be detected and then corresponded to a specific movement within the video game being played. Additionally, video game controllers may also include some sort of optic sensor and often a lens so that the user may point the video game controller in the general vicinity of the television or screen on which the video game is being played and a receiving sensor on the video game system may sense the direction which the controller is pointed and indicate such on the screen or television within the video game. This may often be used with sights or crosshairs in a first person shooter type game where a user may point the controller at the specific point at which he or she desires to shoot.

In many of the first person shooter video games today the games have become quite realistic using modern weaponry of which the user may own or have similar style toys, air soft guns, or replicas. In order to improve game play and provide the user with a more realistic gaming experience, what is desired is a video game controller device which may be incorporated to a firearm to improve game play.

BRIEF SUMMARY OF THE INVENTION

An optional aspect of the present invention may include a video game controller device with an exterior contour which may be shaped like a firearm accessory device. One or more firearm mounts may also be on the video game controller device for connecting to a firearm. Additionally the video game controller device may include a trigger switch jack for simulating fire in the video game when connected to a trigger switch that may be in communication with a trigger on a firearm.

An additional optional aspect of the present invention may include a video game controller device which may have an exterior contour shaped like a firearm suppressor.

Yet another optional aspect of the present invention may include the video game controller device having an exterior contour shaped similarly to a flashlight that may be mounted on a weapon type device.

Further additional optional aspects of the present invention may include one or more firearm mounts which may be a muzzle mount for mounting the video game controller device to a muzzle of a firearm. Optional configurations for the muzzle mount may include various thread patterns ranging from M13.5×1LH to about M16×1LH (metric) as well as 0.578×28 or 0.5×28 (standard).

In yet further optional aspects of the present invention, the one or more firearm mounts may include rail mounts for mounting the video game controller device to rails of a firearm. In yet further optional aspects this may include a Picatinny styled rail mount as such styles of mounts are common among many of today's firearms.

In yet additional optional aspects of the present invention, the video game controller device may include a trigger switch connectible to a trigger switch jack wherein the trigger switch may be configurable to a trigger for firing in the video game.

In yet further optional aspects of the present invention, the video game controller device may include a reload switch jack for simulating reloading within a video game. Optionally, such may also include a reload switch which may be connectible to the reload switch jack to simulate reloading on a firearm type device for reloading within the video game.

Additional optional aspects of the present invention may include a method of playing a video game which includes the steps of mounting a video game controller device to a firearm via one or more mounts on the video game controller device, connecting the video game controller device to one or more controls of a firearm and then using the firearm with the mounted video game controller device to play a video game.

Additional optional aspects of the present invention may include a trigger switch jack and trigger switch which may be connectible and configurable to a trigger of a firearm type device.

Additional optional aspects of the invention may include placing the trigger switch in communication with a trigger of the firearm wherein the trigger switch is also connected a trigger jack of the video game controller device so that shooting may occur within the video game.

Yet a further optional aspect of the present invention may include a reload jack switch and a reloading switch for simulating reloading in a video game. Optionally the reload switch may be placed in communication with a magazine release of the firearm and thus the reload switch may also be connected to the reloading of the reload switch jack of the video game controller device to effect reloading within the video game.

Yet in additional optional aspects of the invention, a user may move the firearm type device to move the point of aim within a video game.

In optional aspects of the present invention, a variety of different firearm type devices may be used which may include air soft firearms, toy firearms, replicate firearms, paintball guns, and actual firearms.

Aside from the structural and procedural arrangement set forth above, the invention could include a number of other arrangements such as those explained hereinafter. It is to be understood, that both the foregoing description and the following description are exemplary.

The accompanying drawings are incorporated in and constitute a part of the specification. The drawings illustrate optional embodiments of the invention and together with the description serve to explain some principles of the invention.

BRIEF DESCRIPTION OF THE DRAWINGS

FIG. 1b is an illustration of the optional embodiment of the video game controller device having an exterior suppressor contour.

FIG. 2b is an illustration of an optional embodiment of the video game controller device having an exterior suppressor contour from the second end.

FIG. 6a is an illustration of an optional embodiment of the video game controller device with an exterior suppressor contour from the first end with set screws.

FIG. 6b is an illustration of an optional embodiment of the video game controller having an exterior flashlight contour from the first end with set screws.

FIG. 6c is an illustration of an optional embodiment of the video game controller device with an exterior suppressor contour viewed from the side of the first end with set screws.

FIG. 7 is an illustration of an optional embodiment of the video game controller device with an exterior flashlight contour.

FIG. 8a is an illustration of an optional embodiment of the video game controller device with a rail mount.

FIG. 8b is an illustration of an optional embodiment of the video game controller device with a rail mount.

FIG. 8c is an illustration of an optional embodiment of the video game controller device with a rail mount.

Reference will now be made in detail to optional embodiments of the invention, examples of which are illustrated in the accompanying drawings. Whenever possible, the same reference numbers are used in the drawing and in the description referring to the same or like part.

DETAILED DESCRIPTION

Figure 2A:
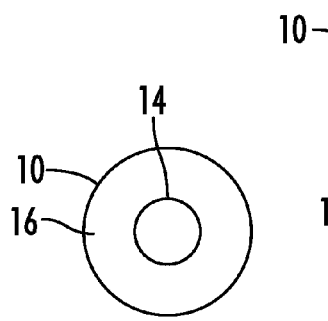
FIG. 2a is an illustration of the optional embodiment of the video game controller device having an exterior suppressor contour from the first end.
Figure 1A:
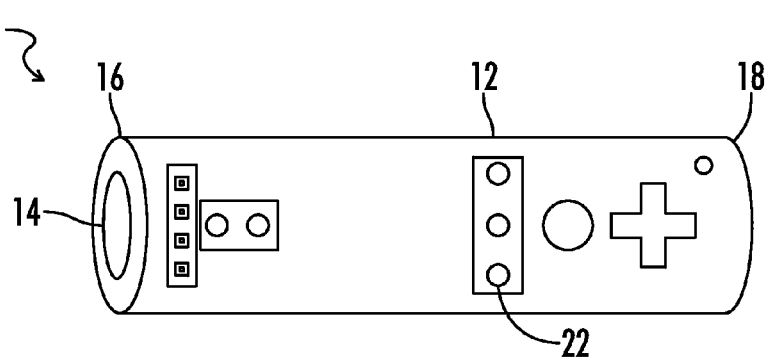
FIG. 1a is an illustration of an optional embodiment of the video game controller device having an exterior suppressor contour.
Figure 3:
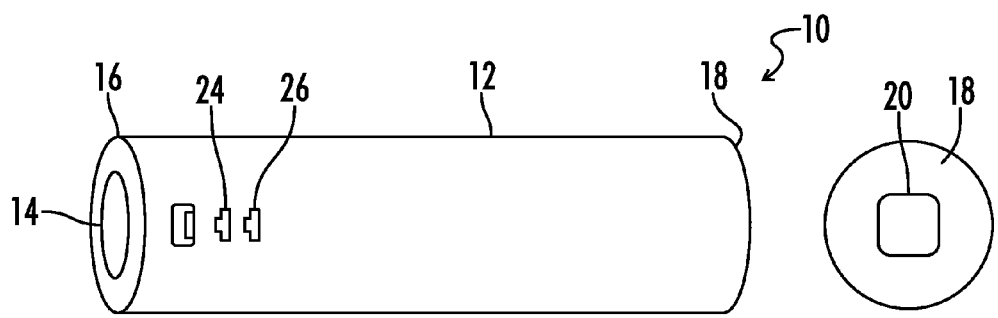
FIG. 3 is an illustration of an optional embodiment of the video game controller device with a door to install the controller within the exterior suppressor housing.
Figure 3:
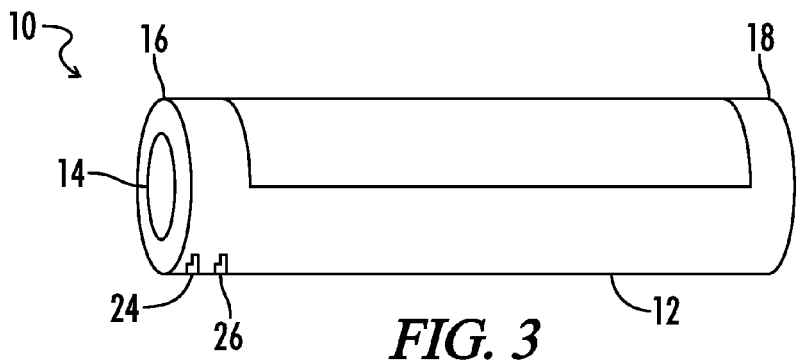
Figure 4A:
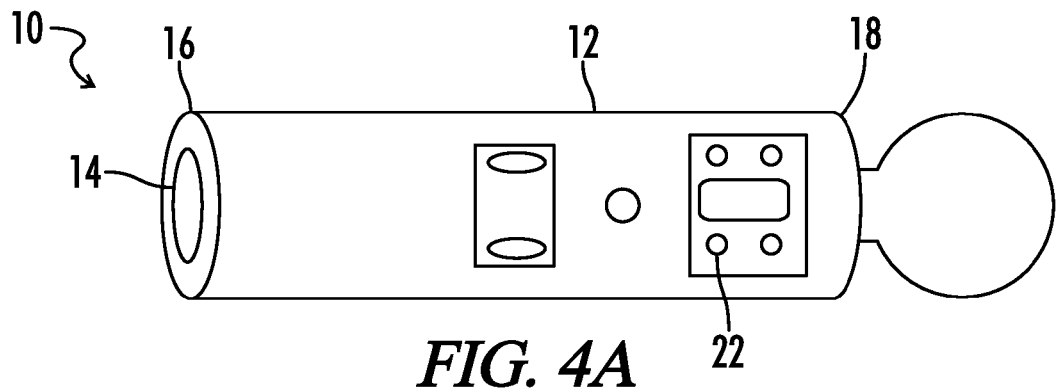
FIG. 4a is an illustration of an additional optional embodiment of the video game controller device having an exterior suppressor contour.
Figure 4B:
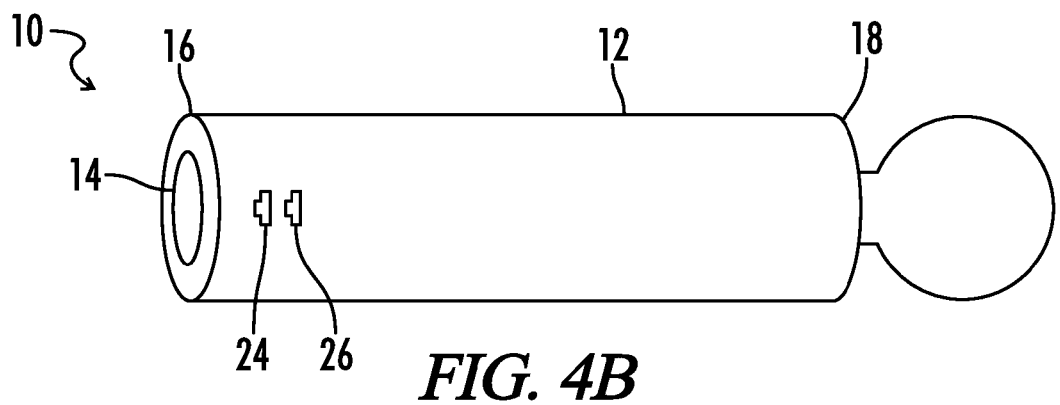
FIG. 4b is an illustration of an optional embodiment of the video game controller device with an exterior suppressor contour.
Figure 5A:
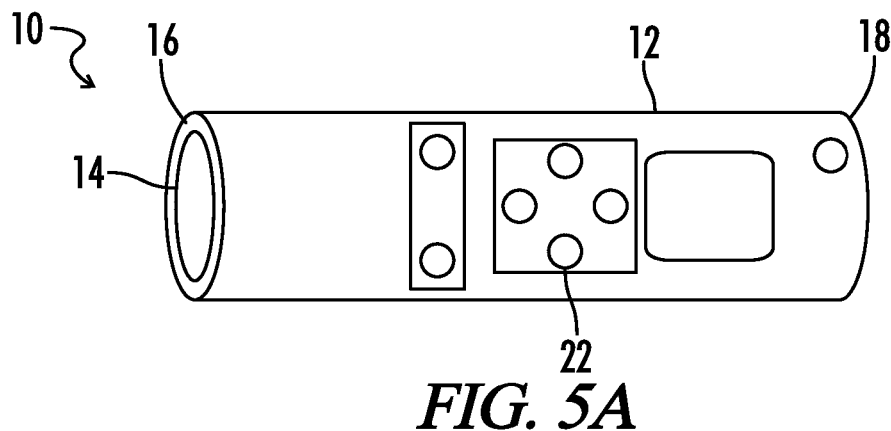
FIG. 5a is an illustration of an additional optional embodiment of the video game controller device having an exterior suppressor contour.
Figure 5B:
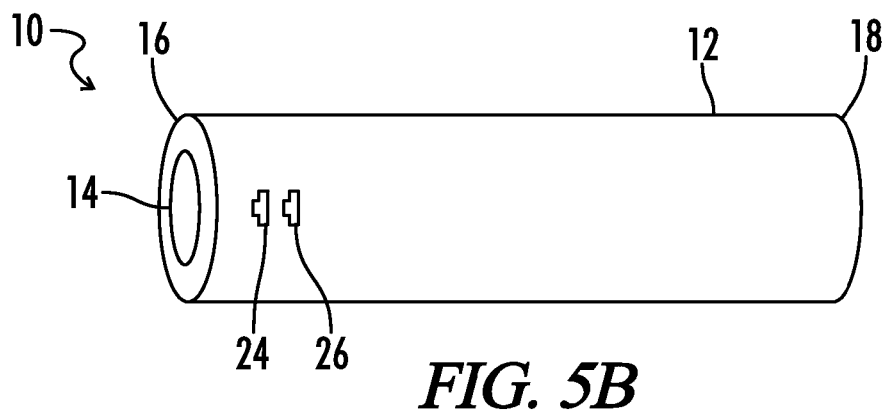
FIG. 5b is an illustration of an optional embodiment of the video game controller device with an exterior suppressor contour.
Figure 9:
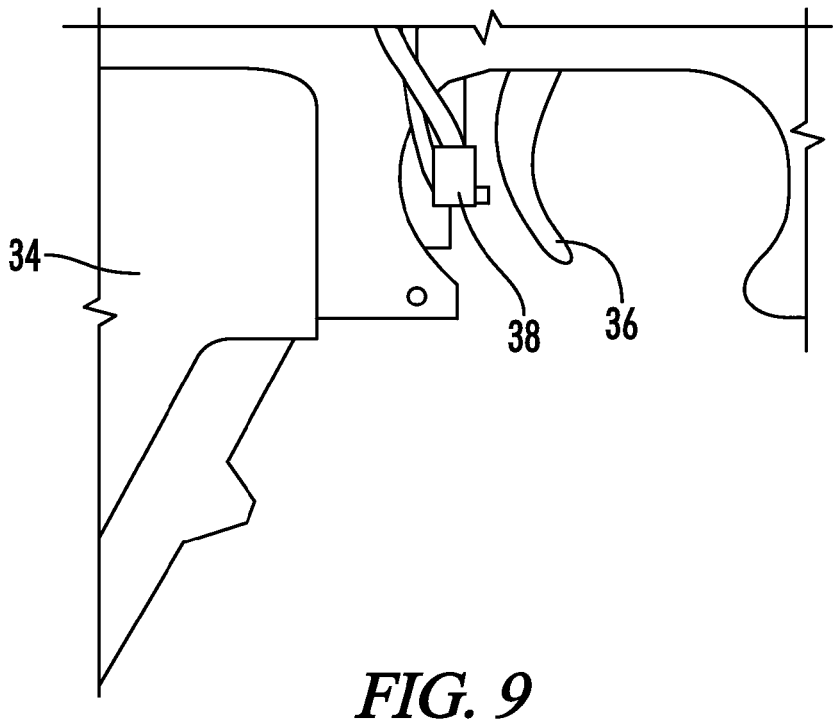
FIG. 9 is an illustration of an optional embodiment of the trigger switch in conjunction with a trigger of a firearm.
Figure 10:
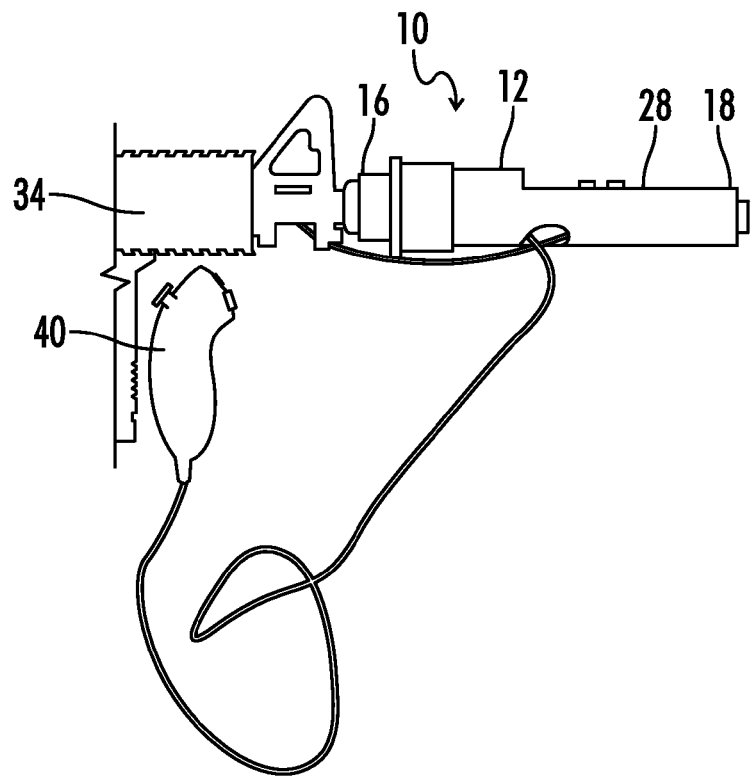
FIG. 10 is an illustration of an optional embodiment of the video game controller device with an exterior suppressor contour including an additional controller.
Figure 11:
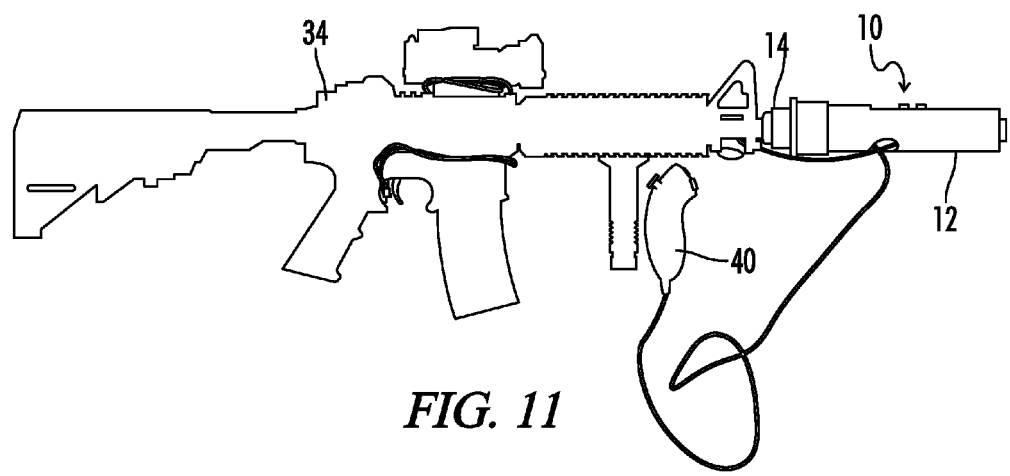
FIG. 11 is an illustration of an optional embodiment of the video game controller device with an exterior suppressor contour including an additional controller.
Figure 12:
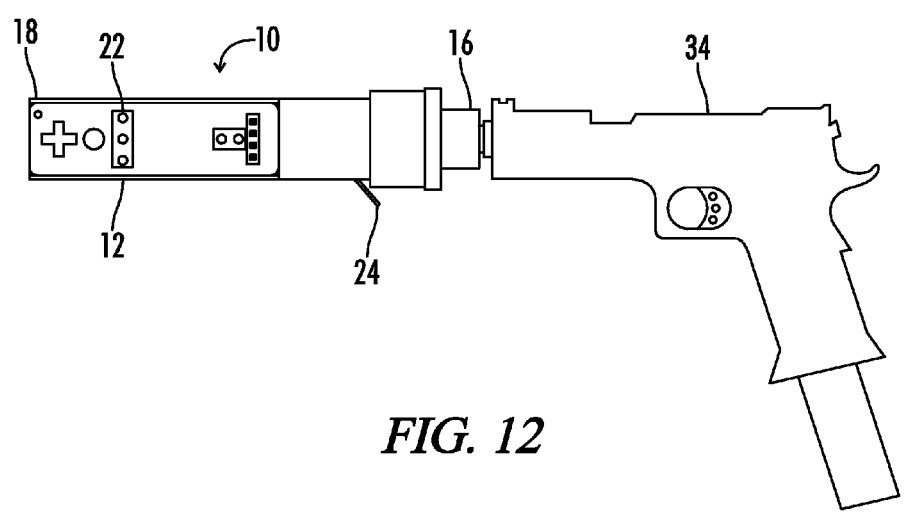
FIG. 12 is an illustration of an optional embodiment of the video game controller device with an exterior suppressor contour attached to a hand gun.
Figure 13:
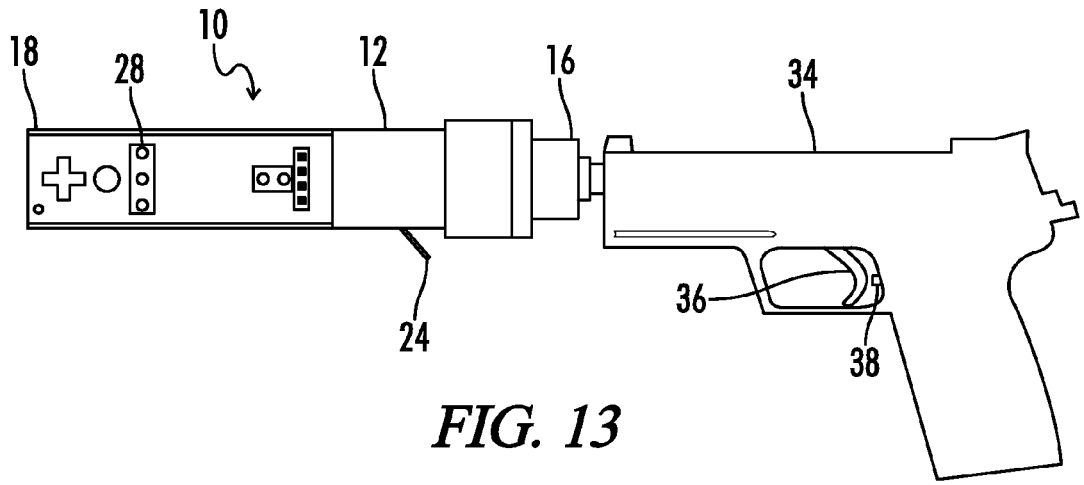
FIG. 13 is an illustration of an optional embodiment of the video game controller device with an exterior suppressor contour attached to a hand gun.
Figure 14:
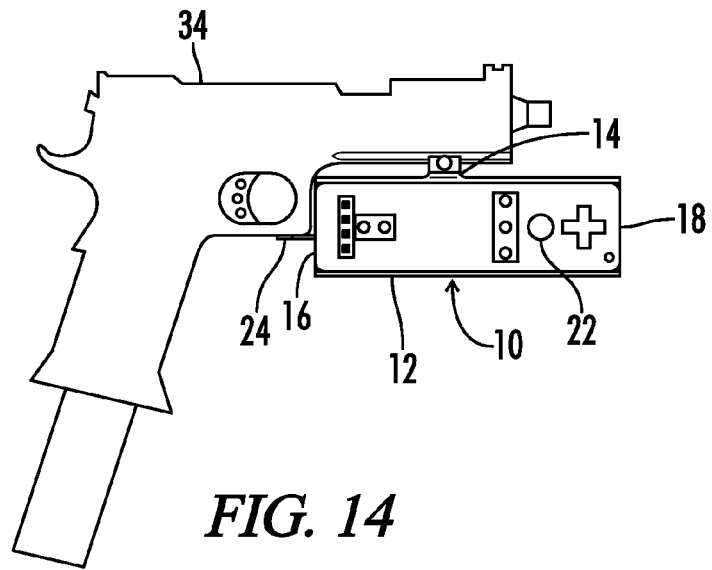
FIG. 14 is an illustration of an optional embodiment of the video game controller device with an exterior flashlight contour attached to a rail of a hand gun.
Figure 15:
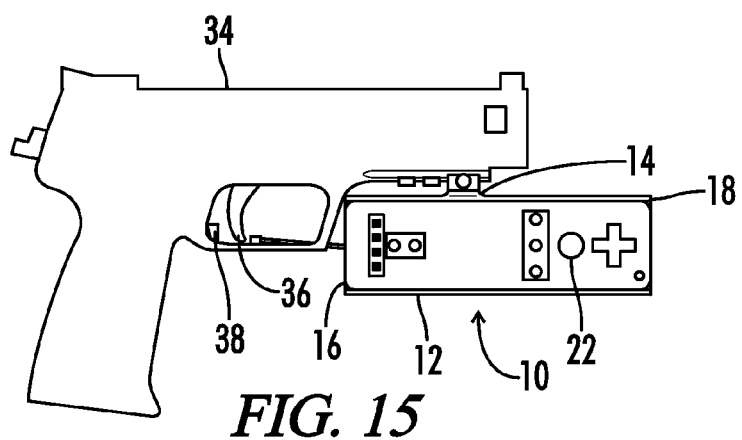
FIG. 15 is an illustration of an optional embodiment of the video game controller device with an exterior flashlight contour attached to a rail of a hand gun.
Figure 16:
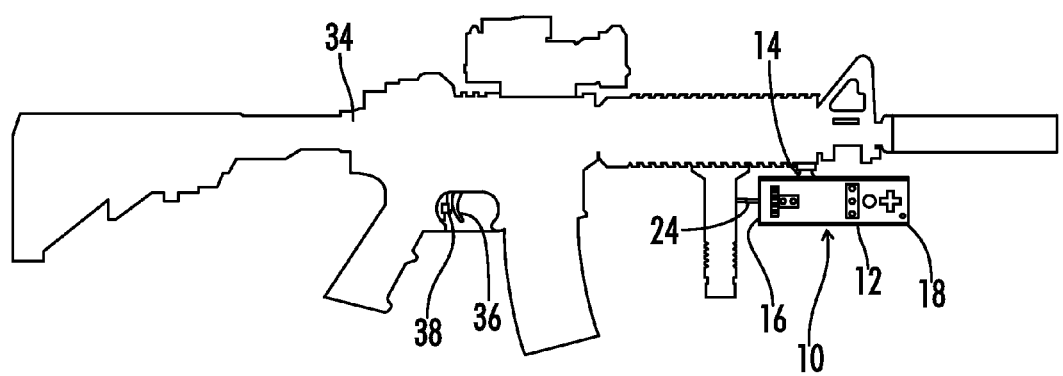
FIG. 16 is an illustration of an optional embodiment of the video game controller device with an exterior flashlight contour attached to a rail of a rifle.
Figure 17:
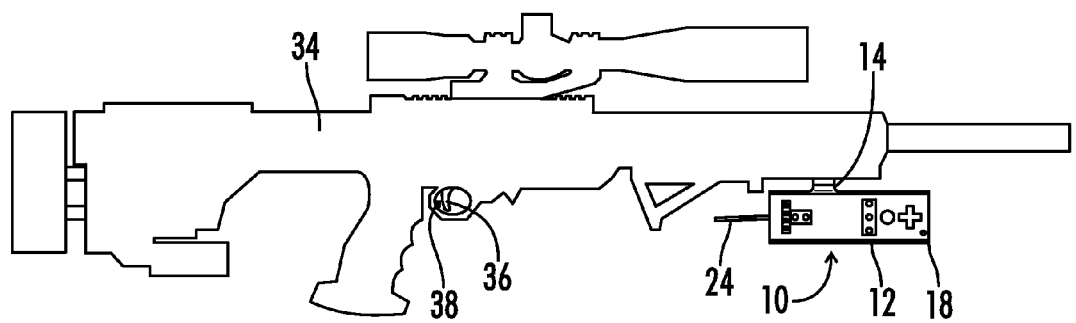
FIG. 17 is an illustration of an optional embodiment of the video game controller device with an exterior flashlight contour attached to a rail of a rifle.

Throughout the specification and claims, the following terms take at least the meanings explicitly associated herein, unless the context dictates otherwise. The meanings identified below do not necessarily limit the terms, but merely provide illustrative examples for the terms. The meaning of "a", "an", and "the" may include plural references, and the meaning of "in" may include "in" and "on". The phrase "in an embodiment" as used herein does not necessarily refer to the same embodiment, although it may.

Referring now to the figures, the video game controller device is referred to by numeral 10 and generally may be attached by firearm mount 14 to firearm 34. Video game controller device 10 includes exterior contour 12 which may in various optional embodiments have the shape of a suppressor, flashlight or other firearm accessory device.

As understood herein the term "suppressor" refers to a mechanical device that may be used to lessen the sound of a gunshot and is generally understood to be an elongated cylinder shaped device. Yet however in further embodiments, exterior contour 12 having a suppressor shape may include other shapes of suppressors that may be available on the market that may not have a cylindrical design.

Yet in other optional embodiments, exterior contour 12 can include an exterior contour of that of a flashlight or other illumination style device for a firearm. As used herein "flashlight" can include flashlights of the ordinary and common meaning as well as specialized illumination devices for firearms. Thus in optional embodiments, exterior contour 12 having an exterior flashlight contour may be shaped in a generally cylindrical fashion as are typical flashlights or, in optional embodiments, may have a shape specialized to a specific illumination device for a firearm.

In optional embodiments, exterior contour 12 has a shape of a suppressor or flashlight so that a user may experience more realistic game play by attaching video game controller device 10 to firearm 34 with the device having a configuration similar to that of a standard firearm accessory. Additionally, as used herein, "firearm" may refer to weapons including both rifles as well as hand guns and shotguns and thus may incorporate both shoulder fired and hand held weapons. The term "firearm" as used herein may also include gas propellant devices as well as generic bb guns or toy guns or replicas so long as the device has an exterior similar to that as one would expect of an actual device that fires live ammunition. Additionally, the term "firearm" may also include paintball guns.

Generally, the video game controller device 10 with exterior contour 12 may be associated together in one of two general ways. In certain embodiments, an actual video game controller which is commercially available may be inserted into exterior contour 12 to create video game controller device 10 whereby the commercially available video game controller may be removable from such exterior contour 12 and thus video game controller device 10. Otherwise stated, in these optional embodiments, the invention may include a combination of exterior contour 12 with a commercially available video game controller that may be removable. In such optional embodiments, the commercially available video game controller may be modified so as to include other components such as a trigger switch jack or reload switch jack which may not be provided in the commercial product.

In yet further optional embodiments, video game controller device 10 may include all components of the video game controller permanently affixed within exterior contour 12. As used herein "permanently affixed" means not intended to be removed and thus one can consider video game controller device 10 of this embodiment not to have a removable commercially available video game controller.

Video game controller device 10 includes firearm mount 14 which may have various forms in different optional embodiments. In one optional embodiment of video game controller device 10 with firearm mount 14, firearm mount 14 may include a muzzle mount. In such embodiment, firearm mount 14 on first end 16 of video game controller device 10 may include a cylindrical opening so that muzzle 42 of firearm 34 may fit within firearm mount 14. In such optional embodiments, firearm mount 14 may include threads 32 for attaching to muzzle 42 of firearm 34.

As is understood in the industry, a variety of common thread patterns exist for muzzles of firearms. Such thread patterns may include M13.5×1LH or alternatively M16×1LH as well as 0.578×28 or alternatively 0.5×28. While these may comprise common thread pitches for muzzles 42 of various firearms 34, the invention includes the adaptability of firearm mount 14 with various internal thread patterns for threads 32 so that video game controller device 10 may be affixed to various firearms with various thread patterns not discussed in this disclosure. Otherwise stated, a variety of different thread patterns may be utilized with video game controller device 10.

In optional embodiments, firearm mount 14 of video game controller device 10 when used to mount to muzzle 42 of firearm 44 may include a removable thread 32 of firearm mount 14 so that additional thread patterns may be input into video game controller device 10. This may be done so that video game controller device 10 can be utilized with a variety of different firearms 34 that may include different thread patterns on muzzle 42. With this adaptability, video game controller device 10 may be included on such different firearms. In additional optional embodiments, firearm mount 14 of video game controller device 10 may include one set thread pattern for threads 32 so that video game controller device 10 may be affixed only to one pattern of threads on muzzle 42 of firearm 34.

In optional embodiments where video game controller device 10 is utilized with firearm mount 14 to attach to muzzle 42 of firearm 34, exterior contour 12 may include a suppressor shape. This is because, in practice, suppressors are attached to the muzzle of firearms and provide suppression of the sound of a gunshot. With such design, a user may experience a more realistic game play through, not only incorporating a video game controller device to a firearm, but by also including video game controller device 10 with exterior contour 12 as a suppressor shape so that a user experiences the aspects of a simulated suppressor on a firearm.

Video game controller device 10 may include access to video game controller buttons 22 so a user may also press the buttons during game play if necessary. With video game controller buttons 22 exposed, a user may be able to either select or start the game as well as perform various tasks in the game in addition to simulating shooting.

At second end 18 of video game controller device 10 there generally is a lens or an equivalent type structure for providing some type of light beam to engage the video game system. In other optional embodiments, second end 18 may include instead of lens 20 some kind of reflector type device which performs a generally equivalent function of lens 20 but nevertheless functions so as to provide a user with the ability to point video game controller device 10 and thus move a point of aim on the actual video game in a first person shooter type of game.

In yet further optional embodiments of the invention, video game controller device 10 with firearm mount 14 may include firearm mount 14 having a design to mount to a rail of firearm 34. In these optional embodiments of video game controller device 10, firearm mount 14 generally may include a mechanical shape adaptable to rails on a firearm. In yet further optional embodiments, video game controller device 10 may include multiple firearm mounts 14 so that video game controller device 10 may mount to firearm 34 at multiple points. This may increase the stability of video game controller device 10.

In further optional embodiments video game controller device 10 with firearm mount 14 may include two firearm mounts 14 for attaching when firearm 34 is a rifle or in optional embodiments may include one firearm mount 14 for attaching when firearm 34 as a hand gun. Lesser or greater numbers of firearm mounts 14 may be used with video game controller device 10 and in optional embodiments firearm mount 14 may be removable (or conversely could be added) to video game controller device 10 so that a user may switch from using video game controller device 10 on a hand gun to a rifle and vice versa.

In yet further optional embodiments, when firearm mount 14 is designed to mount to a rail of a firearm, video game controller device 10 may include exterior contour 12 as a flashlight. This is because in many applications users utilize flashlights on the rails of firearms whether hand guns or rifles. In such optional embodiments firearm mount 14 may include what is known in the industry as a Picatinny rail mount design as a variety of firearms include Picatinny rails for attaching firearm accessories. In yet further optional embodiments of video game controller device 10, firearm mount 14 may include various other ways of attachment including through the use of clamps, set screws, or the like so that video game controller device 10 is firmly affixed to firearm 34 for game play. Generally, video game controller device 10 should be attached so that when a user moves firearm 34 with video game controller device 10 attached, video game controller device 10 generally maintains a fixed orientation relative to firearm 34. Otherwise stated, video game controller 10 should exhibit little to any wobble when attached properly by one or more firearm mounts 14 to firearm 34.

Optional embodiments of video game controller device 10 may include trigger switch jack 24. Generally, trigger switch jack 24 may communicate with trigger switch 38 which is in communication with trigger 36 of firearm 34 so that when a user pulls trigger 36 of firearm 34, video game controller device 10 simulates gunfire within the video game. In optional embodiments, trigger switch jack 24 may be connected via wire to trigger switch 38 for communicating. In yet further optional embodiments, trigger switch 38 may be a pressure sensitive trigger switch 38 so that when trigger 36 is pulled it may contact trigger switch 38 and simulate firing in the video game.

In yet further optional embodiments, video game controller device 10 may include reload switch jack 26. Similar to trigger switch jack 24, reload switch jack 26 may be in communication with reload switch 44. In optional embodiments, reload switch 44 may be located on magazine release 46 of firearm 34. Thus by pressing magazine release 46 on firearm 34 to simulate reloading of the firearm through use of reload switch 44 and reload switch jack 26 of video game controller 10, the user would also effect a reload within the video game. Generally speaking, reload switch 44 would be located on top of magazine release 46 and could include a pressure switch. As understood herein, "magazine release" refers to any button, lever, switch, or catch that may be used to maintain a magazine within a firearm. For example, on a pistol, the magazine release may be near the trigger guard and is often operated by the user's thumb. For a rifle, the magazine release may be on the right side of the firearm and operated by the user's forefinger. In further embodiments, reload switch 44 may be located on top of or in communication with magazine release 46.

In operation, the use of reload switch 44 and trigger switch 38, may be linked to the trigger switch 24 and reload switch jack 26 which, generally, upon activation, performs the same function as if a user depressed video game controller buttons 22 corresponding to the shooting and reloading aspects of the video game. In some optional embodiments, one or both switches may be absent and thus a user could just use controls on video game controller device 10 rather than the functionality of firearm 34 to shoot and reload in the video game.

In yet further optional embodiments, various additional switch jacks and switches could be included. For example, additional jacks and switches could be used to operate a grenade launcher within the video game by having a grenade launcher jack and corresponding switch to provide the user with further controls for that additional aspect of the video game. In yet additional optional embodiments, other gaming aspects could be performed through the use of switches located on firearm 34. An additional example might be in the change of scopes or optics whereby the user may activate a switch located near to where an optic may be located on firearm 34 to use a different scope within the video game.

In yet further optional embodiments, the use of jacks may be unnecessary as embodiments may include the switches being hardwired into the game controller device. In such optional embodiments, wires may extend from the game controller device with the switches attached to the ends of the wires, wherein the switches can then be positioned appropriately. As such, the use of jacks may not be necessary as the connections may be maintained within the controller device.

In other optional embodiments of video game controller device 10, exterior contour opening 28 may be included. In such embodiments where a commercial video game controller may be integrated into video game controller device 10, exterior contour opening 28 may be used to position the commercial video game controller within exterior contour 12. In further optional embodiments, video game controller device 10 may include exterior contour opening 28 sized specifically to one certain type of commercial video game controller. For example, commercial video game controllers for various video game systems may be used and thus video game controller 10 may include a specific exterior contour opening 28 for each type of commercial controller. Specific video game controllers that may be used with optional embodiments of video game controller device 10 may include but are not limited to Nintendo Wii as well as the Microsoft Xbox 360 and Sony PlayStation 3.

In further optional embodiments, exterior contour opening 28 may include a door that may be shut and cover the commercial video game controller. In types of games where further access to the buttons is not needed or is seldom needed, one could close a door on exterior contour opening 28 so as to provide more realism to video game controller device 10. Additionally, the optional door on exterior contour opening 28 may serve a dual function of also assisting to maintain the commercial video game controller within video game controller device 10. In some optional embodiments, the door for exterior contour opening 28 of video game controller device 10 may be attached to exterior contour 28 though in other embodiments of exterior contour 28, the door may be removable. This embodiment may be advantageous as a user has the option to remove the door of exterior contour 28 completely and thus depending upon the user's preferences or the specific game of choice, various options are available to the user.

In yet further optional embodiments of video game controller device 10, first end 16 may include one or more set screws 30. Set screws 30 may be used differently depending upon the embodiment of video game controller device 10. In some optional embodiments of video game controller device 10, set screws 30 may be screwed into first end 16 and function to put pressure on a commercial controller so that it remains in place within exterior contour 12 of video game controller device 10. Otherwise stated, one or more set screws 30 may be rotated so that they advance into the inner area of video game controller device 10 to press a commercial video game controller against the other interior end of video game controller device 10. Thus, in swinging video game controller device 10 around in playing a video game, the commercial video game controller would be set in place. In optional embodiments where there is not a removable element to video game controller device 10, set screws could still be used to secure inner-workings of video game controller device 10 in place within the device. In other optional embodiments, generally even numbers of set screws 30 are used so that pressure may be applied evenly. However, one could use odd numbers of set screws or in other embodiments the user may use no set screws 30 at all for video game controller device 10.

Additional optional embodiments of video game controller device 10 may include the set screws being used as spacers. As in some embodiments, exterior contour 12 of video game controller device 10 includes a suppressor shape with firearm mount 14 capable of screwing on muzzle 42 of firearm 34, set screws 30 can be used to correctly orient video game controller device 10. Thus, one could back set screws 30 of video game controller device 10 out far enough so that video game controller device 10 clocks correctly with muzzle 42 of firearm 34. This may be optionally used so that when a user screws video game controller device 10 to the firearm, video game controller buttons 22 of video game controller device 10 are oriented on the upper area. In other optional embodiments, a user may use set screws 30 so that the video game controller buttons may be better oriented for a left-handed or right-handed user of video games. Furthermore, if multiple set screws 30 are present on first end 16 of video game controller device 10, then some set screws may be used to properly clock with muzzle 42 of firearm 34 and other set screws maybe used to secure the inner components of video game controller device 10. However, in other embodiments set screws 30 may be absent from video game controller device 10.

In further optional embodiments of video game controller device 10, additional controller 40 may be utilized. In some video games additional controller 40 is used for specific functions within the video game. This may include movement, or actions other than shooting, or further may provide other features within the video game. Thus, additional controller 40 may be linked to video game controller device 10, generally through the standard link connection specific for the video game system in which video game controller device 10 is being utilized therewith.

In use, a user may acquire video game controller device 10 which may be specific to the video game console in possession of the user. In additional embodiments, video game controller device 10 may include exterior contour opening 28 for a commercial video game controller. A user may then choose firearm 34. Generally, a user would likely prefer to use a firearm similar to that of the game play so that the experience of the video game would be more realistic. In some instances firearm 34 may include a rifle, in other embodiments, firearm 34 may include a handgun.

In attaching video game controller 10 to firearm 34, a user would likely either mount video game controller 10 to muzzle 42 of firearm 34 or to a rail on firearm 34, depending upon exterior contour 12 and firearm mount 14 of video game controller 10. If exterior contour 12 is of a suppressor shape, a user would mount video game controller 10 via firearm mount 14 to muzzle 42 of firearm 34. This would be first end 16 of video game controller 10 attaching to muzzle 42 of firearm 34 with lens 20 located on second end 18 of video game controller 10. If such embodiments include set screws 30, a user may adjust set screws 30 to either properly clock video game controller 10 relative to firearm 34 or may use set screws 30 to better secure a commercial video game controller within video game controller 10 if such is called for.

For embodiments where video game controller 10 has exterior contour 12 of a flashlight, firearm mounts 14 may be used to attach video game controller 10 to the rail of firearm 34. This may include one or more firearm mounts 14 located on video game controller 10 which further may include a Picatinny style mount. In optional embodiments, one or more firearm mounts 14 may be removable from video game controller 10 so that a user can have better mount video game controller 10 to either a handgun or a rifle.

Upon the selection of firearm 34, the user may then locate trigger switch 38 and place it in communication with trigger 36 of firearm 34. Trigger switch 38 could also be placed in communication with trigger switch jack 24 of video game controller device 10 so that the user would be able to shoot within the video game by using trigger 36 of firearm 34.

Additionally, a user may locate reload switch 44 and place it in communication with magazine release 46 of firearm 34. Reload switch 44 could also be placed in communication with reload switch jack 26 of video game controller device 10 so that the user would be able to reload within the video game by using magazine release 46 of firearm 34.

In playing the video game, a user could then point video game controller 10 at the location in which the player desired to shoot in the video game and if the user's aim was successful, the user could pull trigger 36 of firearm 34 and activate trigger switch 38 which in communication with trigger switch jack 26 would cause video game controller 10 to function as if a user simply pressed video game controller button 22 which corresponded to shooting.

In instances where the user desired to reload within a video game, a user could depress magazine release 46 on firearm 34. This would activate reload switch 44 and thus in communication with reload switch jack 26 would cause an action within the video game similar to if a user simply pressed a button to reload the firearm within the video game.

Video game controller 10 may be constructed of a variety of materials though most embodiments usually will be primarily formed from polymers. In some optional embodiments, video game controller 10 may be formed of metal or heavier weighted materials to provide for an even more realistic game play as such video game controller 10 may have a weight that more closely approximates that of the firearm accessory which video game controller 10 may simulate. Thus, metals including steels, alloys and aluminum may be used in forming portions of video game controller 10 including but not limited to exterior contour 12. Additionally, exterior contour 12 could have markings similar to brands of suppressors or flashlights so that the user has an even more similar platform within which to play the video game. Otherwise stated, in some optional embodiments, video game controller 10 may closely approximate that of a suppressor or flashlight thorough the use of various weighted materials and possible marking and shapes on exterior contour 12.

Figure 18A:
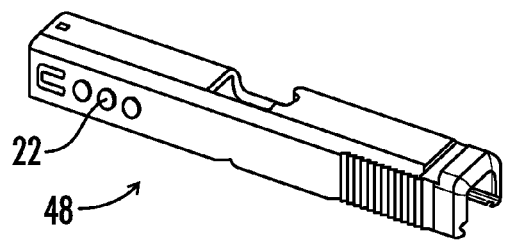
FIG. 18a is an illustration of an optional embodiment of a slide for a video game controller device adapted to a firearm.
Figure 18B:
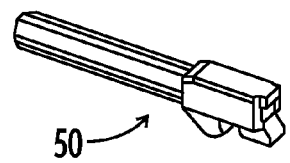
FIG. 18b is an illustration of an optional embodiment of a barrel of a video game controller device for use with a firearm.
Figure 18C:
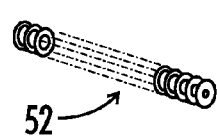
FIG. 18c is an illustration of an optional embodiment of a recoil rod and spring of a video game controller device for use with a firearm.
Figure 18D:
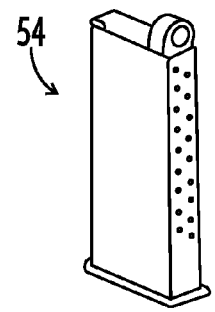
FIG. 18d is an illustration of an optional embodiment of a magazine of a video game controller device for use with a firearm.

Now referring to FIGS. 18*a-d*, there exists an additional embodiment which may be used to alter an existing firearm for use in a game requiring a light beam for shooting. In such embodiment, one could replace the entire upper portion of a handgun with replacement slide 48, replacement barrel 50, replacement recoil spring 52, and replacement gas-magazine 54. In use the combination of parts would emit a light beam so as to activate functions on a video game. Similar to gas powered airsoft firearms, one would use gas-magazine 54 with a gas propellant to cycle replacement slide 48. Additionally, replacement slide 48 may include buttons 22 to perform functions within the game. For example, buttons 22 may be used to cycle through menus and pause or start the game, among other uses.

In some embodiments, batteries could also be contained within the barrel to allow power to emit light from an emitter within replacement barrel 50. In practice, the pull of the trigger would allow a striker or hammer to go forward and hit the rear of the barrel 50, thus causing a light beam to be emitted from barrel 50. Such action would also allow for the specific release of gas from replacement gas-magazine 54. The release of gas from gas-magazine 54 would be directed upward and thus would cycle replacement slide 48 of this embodiment. By cycling replacement slide 48, the trigger would be activated so as to allow for subsequent shots. In further optional embodiments not illustrated, the bolt or equivalent part could be replaced within a rifle so as to provide a user with training for such firearms as well.

With such embodiments, a user would be able to use a traditional handgun with the new upper with a video game. In doing so, one would be able to have a more realistic game play experience while receiving practice with that weapon platform. In similar embodiments, one could use a traditional rifle with a replacement bolt with a videogame to receive practice with that weapon platform.

Furthermore, sizes of various structural parts and materials used to make the above-mentioned components are illustrative and exemplary only, and persons of ordinary skill in the art would recognize that these sizes and materials can be changed as necessary to produce different results or different desired characteristics. It would become apparent to those skilled in the art that various modifications and variations can be made to the structure and methodology of the present invention. Thus, it should be understood that the invention is not limited to the examples disclosed in the specification. Rather, the present invention is intended to cover modifications and variations.

Thus, although there have been described particular embodiments of the present invention of a video game controller device it is not intended that such references be construed as limitations upon the scope of this invention except as set forth in the following claims.

What is claimed is:

1. A videogame controller device comprising:
   a. a videogame controller housing, the housing having a firearm accessory exterior contour;
   b. one or more firearm mounts on the videogame controller housing, the one or more mounts for connecting the videogame controller housing to a firearm; and
   c. a trigger switch in connection with the videogame controller configurable to a trigger of the firearm.

2. The videogame controller device of claim 1 wherein the firearm accessory exterior contour of the videogame controller housing further comprises a suppressor shape.

3. The videogame controller device of claim 1 wherein the firearm accessory exterior contour of the videogame controller housing further comprises a flashlight shape.

4. The videogame controller device of claim 1 wherein the one or more firearm mounts comprises a muzzle mount.

5. The videogame controller device of claim 4 wherein the muzzle mount comprises a thread pattern of ranging from M13.5×1LH to about M16×1LH.

6. The videogame controller device of claim 4 wherein the muzzle mount comprises a thread pattern of 0.578×28.

7. The videogame controller device of claim 4 wherein the muzzle mount comprises a thread pattern of 0.5×28.

8. The videogame controller device of claim 1 wherein the one or more firearm mounts comprise one or more rail mounts.

9. The videogame controller device of claim 8 wherein the one or more rail mounts comprise one or more Picatinny rail mounts.

10. The videogame controller device of claim 1 further comprising a trigger switch jack for connecting the trigger switch.

11. The videogame controller device of claim 1 further comprising a reload switch for simulating reloading in a videogame.

12. The videogame controller device of claim 11 further comprising a reload switch jack for connecting the reload switch jack for reloading in the videogame.

13. A method of playing a video game comprising the steps of:
   a. Mounting a videogame controller device to a firearm via one or more mounts on the videogame controller device;
      i. the videogame controller device also comprising a housing a firearm accessory exterior contour;
      ii. the one or more firearm mounts located on the videogame controller housing; and
      iii. a trigger switch jack for operating a button to simulate firing in a videogame;
   b. connecting the videogame controller device to one or more control of the firearm and
   c. using the firearm with mounted videogame controller to play a video game.

14. The method of claim 13 wherein the videogame controller device further comprises a trigger switch connectable the trigger switch jack and configurable to a trigger of the firearm.

15. The method of claim 14 wherein step b) further comprises placing the trigger switch in communication with a trigger of the firearm, the trigger switch also connecting to the trigger switch jack of the videogame controller device.

16. The method of claim 13 where the videogame controller device further comprising a reload switch jack a reloading switch for simulate reloading in a videogame.

17. The method of claim 16 wherein step b) further comprises placing the reload switch in communication with a magazine release of the firearm, the reload switch also connecting to the reload switch jack of the videogame controller device.

18. The method of claim 13 wherein step c) comprises pressing the trigger of the firearm and pressing the magazine release of the firearm to firing and reloading in the videogame.

19. The method of claim 13 wherein step c) further comprises moving the firearm to move a point of aim of within the videogame.

20. The method of claim 13 wherein the firearm may be chosen from airsoft firearms, toy firearms, replicate firearms, and actual firearms.

* * * * *